UNITED STATES PATENT OFFICE.

TOMENOSUKE MUTO, OF KOBE, JAPAN, ASSIGNOR TO KANEGAFUCHI BOSEKI KABUSHIKI KWAISHA, OF TOKYO-FU, JAPAN.

PROCESS FOR PRODUCING AN EXTRACT OF PROTEOLYTIC ENZYMS.

1,296,599.     Specification of Letters Patent.     Patented Mar. 4, 1919.

No Drawing.     Application filed April 25, 1917. Serial No. 164,343.

*To all whom it may concern:*

Be it known that I, TOMENOSUKE MUTO, a subject of the Empire of Japan, residing at 279 Minatomachi 1-chome, Kobe, Japan, have invented a certain new and useful Process for Producing an Extract of Proteolytic Enzyms, of which the following is a specification.

My invention relates to the process of extracting proteolytic enzym from the bodies of silkworms and several other cocoon-forming insects at any desired stage of their growth, as well as from their secretions and discharges, and has for its object to produce a proteolytic enzym easily and economically, and thereby to produce the same in amounts useful in industrial and medicinal uses.

Silkworms and several other cocoon-forming insects, in their metamorphoses from pupa into moth, each secrete a certain juice by which a portion of the cocoon is softened and loosened. Considering that this softening and loosening is due, not to a physical action of wetting, but to a chemical action of certain ingredients contained in the secretion, the inventor has devoted himself to the investigation of said secretion, and has now discovered therein a certain proteolytic enzym which is capable of softening sericin and thereby loosening fibers of silk. Furthermore, the inventor has invented a process of extracting proteolytic enzym not only from the secreted juice but also from the bodies of silkworms and other cocoon-forming insects at every stage of their growth, and from their cast-off skins, secretions and discharges, all of which materials were heretofore considered as mere waste in sericulture and filature.

In carrying the invention into effect, to any products of silkworms, containing the enzym in question, e. g. silkworm pupæ, silkworm-moths, their cast-off skins, secretions and discharges, or similar products from chestnut worms, pine worms, or various other cocoon-forming insects (hereinafter referred to under the general expression "products of cocoon-forming insects") there is preferably added glycerin or other antiseptic material incapable of injuring the enzym, and the same then added to distilled water at a temperature of 5 to 15° C. and allowed to stand for six to forty-eight hours, or the material is mixed with, and allowed to stand in distilled water at a temperature of 40° C. for five to fifteen minutes, and then the material squeezed. The extract, thus obtained, is put in a vacuum evaporator pan, and it is condensed to 10% to 20% of its volume, while at a temperature of about 45° C., and the sediment is then removed.

In the extraction and concentration of the enzym, it will be obvious that temperatures should be employed which do not injuriously affect the enzym. The temperatures above stated are safe in this respect. Temperatures above 50° C. should be avoided for reasons stated below.

According to the purpose for which the product is to be used, the said product may be then further condensed in vacuum to a paste or a solid. Moreover, a comparatively pure residue containing the enzym may be produced by the application thereto of an agent capable of precipitating the enzym, such as alcohol, ether, sulfate of ammonia, etc., or by "salting-out."

The residue produced by one of the above processes, contains a large quantity of a certain proteolytic enzym which decomposes several kinds of albumin, especially sericin. Sericin becomes readily dissolved in a short time by the action of this proteolytic enzym. The other valuable properties of this proteolytic enzym are:—that it is most active at a temperature of 35 to 40° C.; that it is resistant to dry heat, in that it can be subjected, in a dry state, to a temperature of 100° C., without entirely losing its activity; while in moist heat, its activity is gradually reduced at a temperature of over 50° C., and in moist heat at 80° to 90° C. it loses nearly all of its activity; it is especially active in weak acid solutions, as well as in neutral solutions. Also the present proteolytic enzym has all the useful properties common to those heretofore used in similar operations.

Now, as this extract of proteolytic enzym may dissolve sericin in a short time, it may be used effectively in filature, waste silk spinning, and manufacture of floss-silk, to soften or dissolve sericin and to loosen fibers of silk, and if refined, the extract may be used advantageously for the finishing of silk threads and silk fabrics. Furthermore, this extract may be applied, like other proteolytic enzyms, in medicine, as well as in the preparation of peptone, in tanning, and for other purposes.

It is a well known fact that various proteolytic enzyms hitherto known may be used for the above mentioned purposes, but most of those heretofore known are too expensive to be generally used for industrial purposes.

According to the present invention, however, the proteolytic enzym being easily and cheaply produced from waste materials, it may be provided in abundance at a low price.

I claim:

1. A process of producing a proteolytic enzym from products of cocoon-forming insects which comprises adding an antiseptic material not capable of materially injuring the enzym to said material, digesting the mixture with water at a temperature not materially above 40° C., separating the liquor from the undissolved matter, and then separating the enzym from the liquor.

2. A process of producing a proteolytic enzym which comprises digesting material containing products of cocoon-forming insects with water at a temperature not materially above 40° C., separating the liquor from the undissolved matter, and then separating the enzym from the liquor.

3. A process of producing a proteolytic enzym from products of cocoon-forming insects which comprises adding an antiseptic material not capable of materially injuring the enzym to said material, digesting the mixture with water at a temperature not materially above 40° C., separating the liquor from the undissolved matter, concentrating the liquor in vacuum to about 10 to 20% of its original volume, while at a temperature of not materially above 45° C., and then separating the enzym from the liquor.

4. A process of producing a proteolytic enzym from products of cocoon-forming insects which comprises adding an antiseptic material not capable of materially injuring the enzym to said material, digesting the mixture with water at a temperature not materially above 40° C., separating the liquor from the undissolved matter, concentrating the liquor in vacuum to about 10 to 20% of its original volume, while at a temperature of not materially above 45° C., and then precipitating the enzym in a substantially pure state, from the concentrated extract.

5. A process of producing a proteolytic enzym from cocoon-forming insect material which comprises digesting such material with glycerin and water at a temperature too low to materially injure the proteolytic enzym, separating the liquor from the undissolved matter, and separating the enzym from the liquor.

6. A process of producing a proteolytic enzym which comprises digesting material containing "products of cocoon-forming insects" with an aqueous liquid at a temperature too low to injure the proteolytic enzym contained therein, separating the liquor from the undissolved matter, and separating the enzym from the liquor.

7. The herein described new proteolytic enzym which may be produced from products of cocoon-forming insects, which enzym is capable of dissolving sericin, and other proteid bodies, is capable in a dry state of being heated to 100° C., without losing its activity, is incapable of being heated in a wet state to 80° C. without losing a large part of its activity, and which enzym is active in weak acid solutions and in neutral solutions.

In testimony whereof I have affixed my signature in presence of two witnesses.

TOMENOSUKE MUTO.

Witnesses:
 EISHIRO ABE,
 Y. NAGAMATISU.